United States Patent
Betzler et al.

(10) Patent No.: US 8,339,392 B2
(45) Date of Patent: Dec. 25, 2012

(54) INTELLIGENT DEMAND LOADING OF REGIONS FOR VIRTUAL UNIVERSES

(75) Inventors: Boas Betzler, Magstadt (DE); Sean L. Dague, Poughkeepsie, NY (US); Peter George Finn, Brampton (CA)

(73) Assignee: International Business Machines Corporation, Armonk, NY (US)

( * ) Notice: Subject to any disclaimer, the term of this patent is extended or adjusted under 35 U.S.C. 154(b) by 1032 days.

(21) Appl. No.: 12/241,270

(22) Filed: Sep. 30, 2008

(65) Prior Publication Data

US 2010/0079446 A1   Apr. 1, 2010

(51) Int. Cl.
 *G06T 15/00* (2006.01)
(52) U.S. Cl. ........ 345/419; 345/156; 345/473; 345/474; 345/475; 709/205; 715/706; 715/757; 715/765; 715/850
(58) Field of Classification Search .................. 345/473, 345/474, 475, 156, 419; 715/765, 850, 706, 715/757; 709/205
See application file for complete search history.

(56) References Cited

U.S. PATENT DOCUMENTS

| | | | |
|---|---|---|---|
| 5,879,236 A | | 3/1999 | Lambright |
| 6,025,801 A | | 2/2000 | Beitel |
| 6,532,007 B1 | | 3/2003 | Matsuda |
| 6,734,885 B1 | | 5/2004 | Matsuda |
| 6,767,287 B1 | | 7/2004 | Mcquaid et al. |
| 6,801,930 B1 | * | 10/2004 | Dionne et al. ............... 709/205 |
| 6,912,565 B1 | * | 6/2005 | Powers et al. ............... 709/205 |
| 7,293,235 B1 | * | 11/2007 | Powers et al. ............... 715/706 |
| 7,467,356 B2 | * | 12/2008 | Gettman et al. ............. 715/850 |
| 7,737,944 B2 | * | 6/2010 | Harrison et al. ............. 345/156 |
| 7,782,297 B2 | * | 8/2010 | Zalewski et al. ............ 345/156 |
| 7,917,861 B2 | * | 3/2011 | Boettcher et al. ............ 715/765 |
| 8,046,700 B2 | * | 10/2011 | Bates et al. .................. 715/757 |
| 2003/0177187 A1 | | 9/2003 | Levine et al. |
| 2004/0095389 A1 | | 5/2004 | Sidner et al. |
| 2007/0094325 A1 | | 4/2007 | Ih et al. |

* cited by examiner

*Primary Examiner* — Phu K Nguyen
(74) *Attorney, Agent, or Firm* — Yee & Associates, P.C.; Steven Bennett

(57) ABSTRACT

A computer implemented method, a computer program product, and a data processing system manage regions within a virtual universe. A current location of an avatar is identified within a virtual universe, the current location being within a currently populated region. A vectored movement of the avatar is identified. Any adjacent region that may probabilistically encounter a horizon of the avatar within a region activation time of the virtual universe is identified. If the adjacent region is deactivated, then the adjacent region is activated. An unpopulated region that is currently active is identified, wherein the unpopulated region is within an extended distance from the avatar's current location. The unpopulated region is then deactivated.

20 Claims, 6 Drawing Sheets

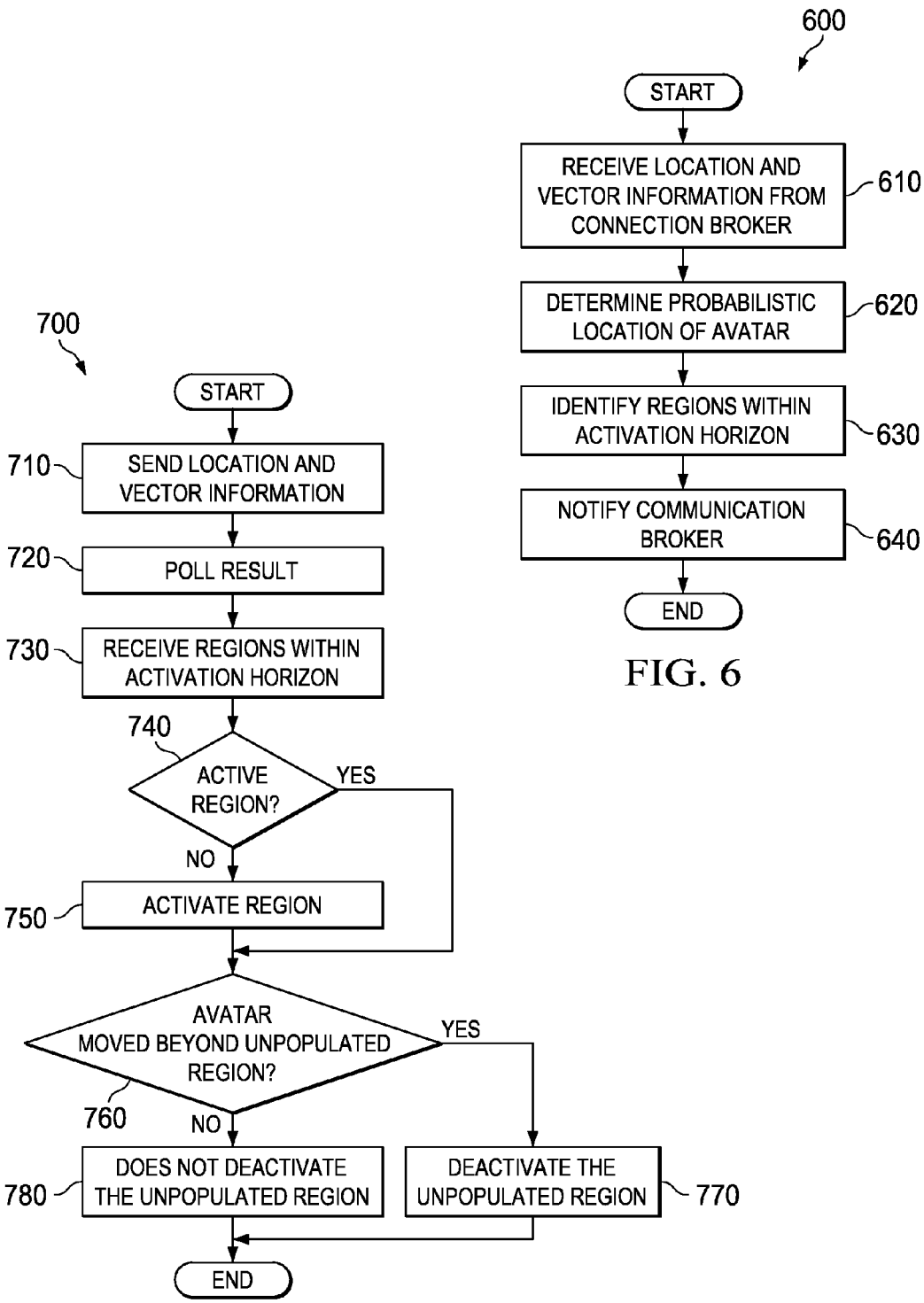

INTELLIGENT DEMAND LOADING OF REGIONS FOR VIRTUAL UNIVERSES

BACKGROUND OF THE INVENTION

1. Field of the Invention

The present invention is related generally to an improved data processing system, and in particular, to a method and apparatus for managing a virtual universe. More particularly, the present invention is directed to a computer implemented method, apparatus, and computer usable program code for implementing geometric and texture modifications of objects in a virtual universe based on characteristics of real world users to enhance the impact of advertising within the virtual universe.

2. Description of the Related Art

A virtual universe (VU), also referred to as a metaverse or "3D Internet", is a computer-based simulated environment. Examples of virtual universes include Second Life®, Entropia Universe, The Sims Online®, There, and Red Light Center. Other examples of virtual universes include multiplayer online games, such as EverQuest®, Ultima Online®, Lineage®, and World of Warcraft® (WoW).

Many virtual universes are represented using three dimensional (3-D) graphics and landscapes. The properties and elements of the virtual universe often resemble the properties of the real world, such as in terms of physics, houses, and landscapes. Virtual universes may be populated by thousands of users simultaneously. In a virtual universe, users are sometimes referred to as "residents."

The users in a virtual universe can interact, inhabit, and traverse the virtual universe through the use of avatars. An avatar is a graphical representation of a user that other users in the virtual universe can see and interact with. The avatar's appearance is typically selected by the user and often takes the form of a cartoon-like representation of a human. However, avatars may also have non-human appearances, such as animals, elves, trolls, orcs, fairies, and other fantasy creatures.

A viewable field is the field of view for a particular user. The viewable field for a particular user may include objects, as well as avatars belonging to other users. An object is an element in a virtual universe that does not represent a user. An object may be, for example, buildings, statues, billboards, signs, and advertisements in the virtual universe. The viewable field of a particular user is determined by the virtual universe grid software according to the geometries and textures that are currently loaded in a user's virtual universe client. The virtual universe grid determines the length of time that a user views an object based on processing the data sent to each virtual universe client.

Virtual universes are made of regions that are stitched together. The breakup of a virtual universe into regions is done to create granulated areas of virtual space which can operate mostly independently from one another. However, a region needs to know about the regions adjacent thereto, so that objects near region boundaries can interact across those region boundaries. Knowledge of adjacent regions is also required for an end user client to be able to cross from one region to another.

BRIEF SUMMARY OF THE INVENTION

According to one embodiment of the present invention, a computer implemented method, a computer program product, and a data processing system manage regions within a virtual universe. A current location of an avatar is identified within a virtual universe, the current location being within a currently populated region. A vectored movement of the avatar is identified. Any adjacent region that may probabilistically encounter a horizon of the avatar within a region activation time of the virtual universe is identified. If the adjacent region is deactivated, then the adjacent region is activated. An unpopulated region that is currently active is identified, wherein the unpopulated region is within an extended distance from the avatar's current location. The unpopulated region is then deactivated.

BRIEF DESCRIPTION OF THE SEVERAL VIEWS OF THE DRAWINGS

FIG. 6 is a flowchart of the processing steps for predictive determination of avatar location according to an illustrative embodiment;

FIG. 7 is a flowchart of the processing step for activating a region within a virtual universe according to an illustrative embodiment.

DETAILED DESCRIPTION OF THE INVENTION

Figure 1:
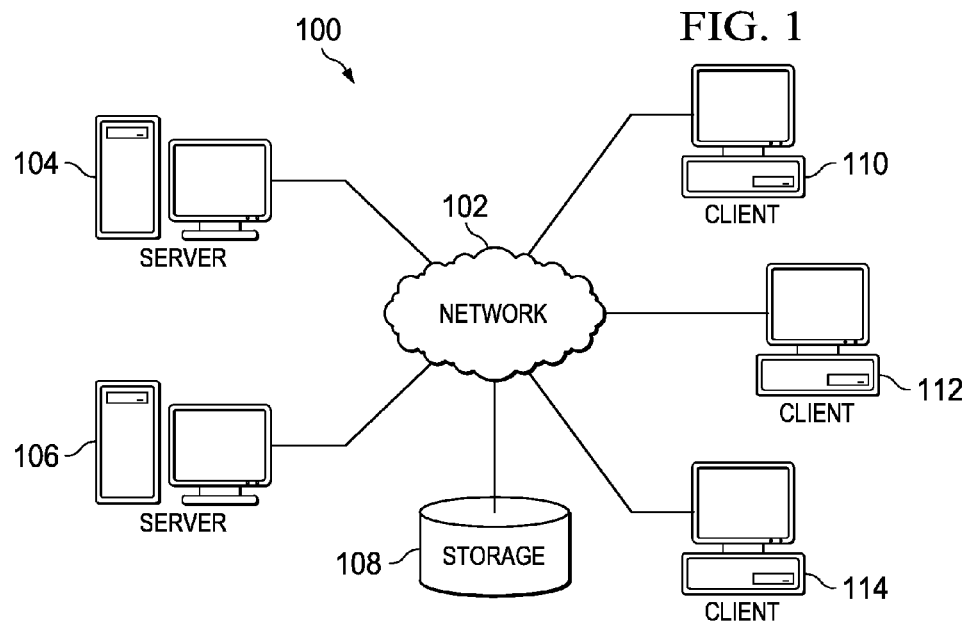
FIG. 1 is a pictorial representation of a network of data processing systems in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A virtual universe is a computer-simulated environment, such as, without limitation, Second Life®, Entropia Universe, The Sims Online®, There, Red Light Center, EverQuest®, Ultima Online®, Lineage®, and World of Warcraft®. A virtual universe is typically represented using three dimensional (3-D) graphics and landscapes.

The users in the virtual universe interact, inhabit, and traverse the virtual universe through avatars. Avatars represent users and are controlled or associated with users. A user can view objects and other avatars within a given proximity of the user's avatar. The virtual universe grid software determines which objects and other avatars are within the given proximity of the user's avatar according to the geometries and textures that are currently loaded in the user's virtual universe client. The virtual universe grid determines the length of time that a user views an object or other avatar in proximity of the user based on processing the data sent to each virtual universe client. However, current virtual universe systems do not enable tracking of objects and avatars within a range of one or more selected objects.

Figure 2:
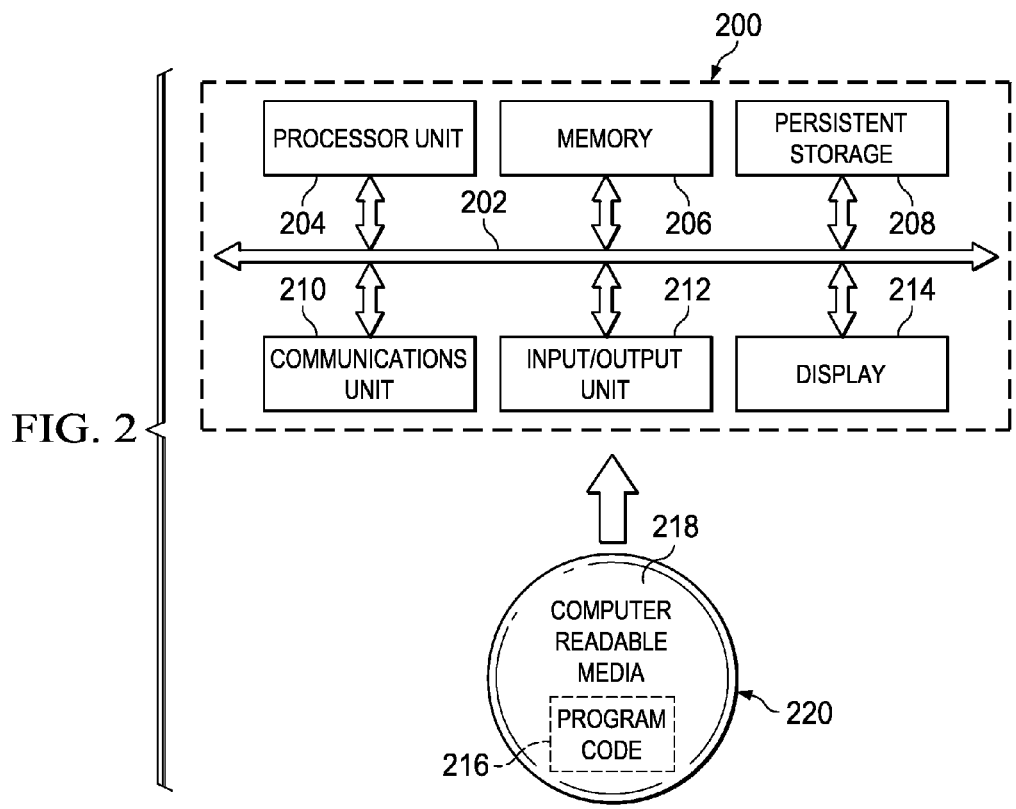
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The illustrative embodiments monitor the presence and absence of Avatars for a map region. An intelligent look ahead is deployed to predict immediate avatar movement and location based on the avatar's current location and vectored movement. For unpopulated map regions without Avatar presence, the region can be deactivated, and state updates can be suspended. Upon an avatar probabilistically encountering a deactivated region, a simulator re-dispatch correctly updates the state of objects and processes in map area during the time passed since while the region was deactivated.

A computer implemented method, a computer program product, and a data processing system manages regions within a virtual universe. A current location of an avatar is identified within a virtual universe, the current location being within a currently populated region. A vectored movement of the avatar is identified. Any adjacent region that may probabilistically encounter a horizon of the avatar within a region activation time of the virtual universe is identified. If the adjacent region is found deactivated, then the adjacent region is activated. An unpopulated region that is currently active is identified, wherein the unpopulated region is within an extended distance from the avatar's current location. The unpopulated region is then deactivated.

As used herein, a "populated region" of a virtual universe includes regions in which an avatar is currently located. A populated region of a virtual universe include can also include those regions that are monitored by an outside monitoring system, such as a real time or recorded video feed. In other words, a populated region is characterized by avatars or monitors that register a synchronous interest in the events of that region. An "unpopulated region" would then be a region without avatars, or other monitoring schemes. In other words, a populated region is characterized by the lack of avatars or monitors.

Figure 3:
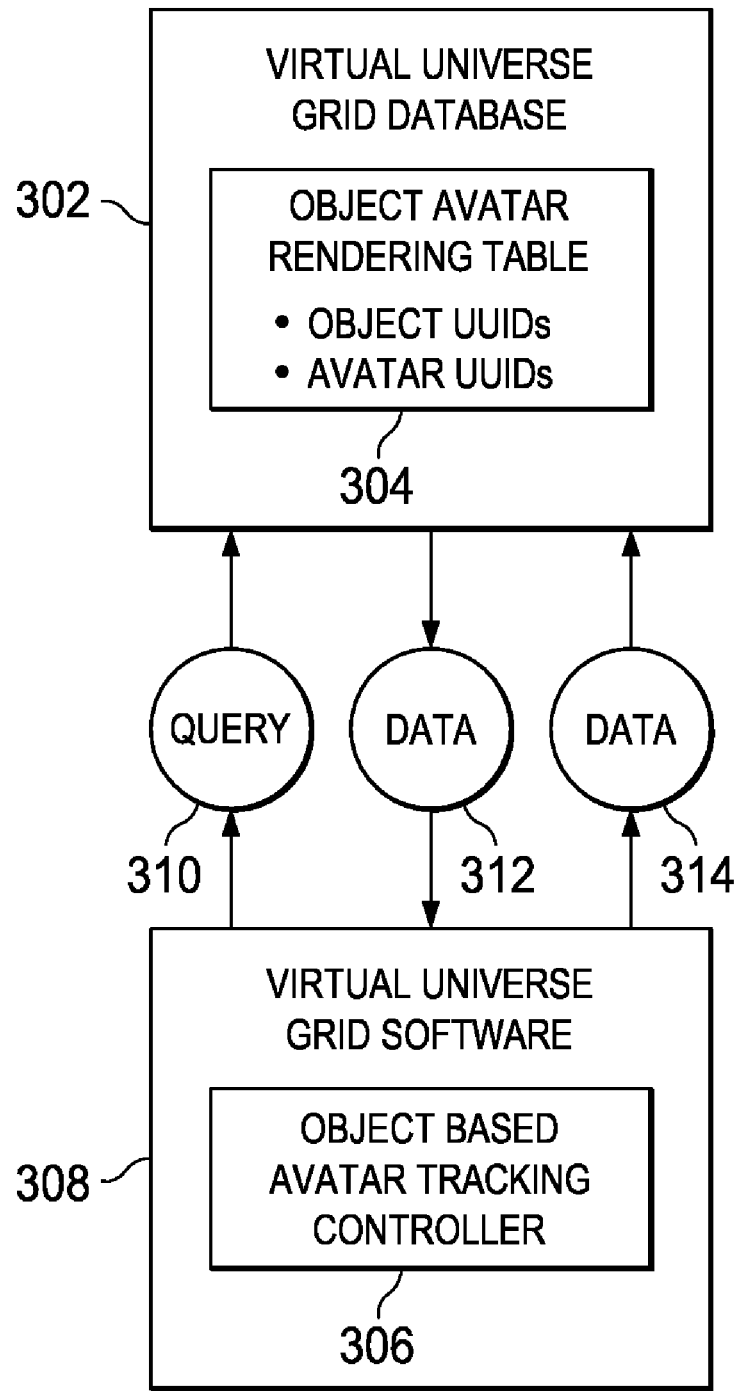
FIG. 3 is a block diagram illustrating a virtual universe grid server in accordance with an illustrative embodiment.

FIG. 3 is a block diagram illustrating a virtual universe grid server in accordance with an illustrative embodiment. Server 300 is a server associated with a virtual universe. Server 300 may be a single, stand-alone server, or server 300 may be a server in a virtual universe grid computing system or in a cluster of two or more servers. In this example, server 300 is a server in a grid computing system for rendering and managing a virtual universe.

Virtual universe grid database 302 is a database on the grid computing system for storing data used by virtual universe grid software 308 to render and manage the virtual universe. Virtual universe grid database 302 includes object avatar rendering (OAR) table 304. Object avatar rendering table 304 stores object unique identifiers and avatar unique identifiers.

In a virtual universe, assets, avatars, the environment, and anything visual consists of unique identifiers (UUIDs) tied to geometric data, textures, and effects data. Geometric data is data associated with the form or shape of avatars and objects in the virtual universe. Geometric data may be used to construct a wire frame type model of an avatar or object. Geometric data is distributed to a user's client computer as textual coordinates. Textures are distributed to a user's client computer as graphics files, such as JPEG files. Texture data refers to the surface detail and surface textures or color that is applied to wire-frame type geometric data to render the object or avatar. Effects data is typically rendered by the user's client according to the user's preferences and the user's client device capabilities.

Object avatar rendering table 304 stores a unique identifier (UUID) for each selected object in the virtual universe. A selected object is an object in a plurality of objects in the virtual universe that is tracked, monitored, managed, or associated with object avatar rendering table 304. Object avatar rendering table 304 also stores unique identifiers and other data describing avatars within a viewable field of a selected object or within a selected zone or range associated with the selected object. For example, if the selected objects include object A and object B, then object avatar rendering table 304 stores object A unique identifier, unique identifiers and other data for all avatars within the viewable field of object A, object B unique identifier, and unique identifiers and other data describing all avatars within the viewable field of object B.

Object based avatar tracking controller 306 stores data 314 in object avatar rendering table 304. Data 314 includes the unique identifiers and other data describing avatars within the viewable field of one or more selected objects. When object based avatar tracking controller 306 needs data from object avatar rendering table 304 for implementing geometric and texture modifications in the virtual universe, object based avatar tracking controller 306 sends query 310 to object avatar rendering table 304. In response to query 310, virtual universe grid database 302 sends data 312 to virtual universe grid software 308 for utilization by object based avatar tracking controller 306 to track avatars and implement modifications of the selected objects to improve the location and appearance of the selected objects within the virtual universe and enable improved visibility of the selected objects.

Virtual universe grid software 308 is software for rendering the virtual universe. Virtual universe grid software 308 includes object based avatar tracking controller 306. Object based avatar tracking controller 306 is software for tracking avatars within the viewable field of each selected object.

Figure 4:
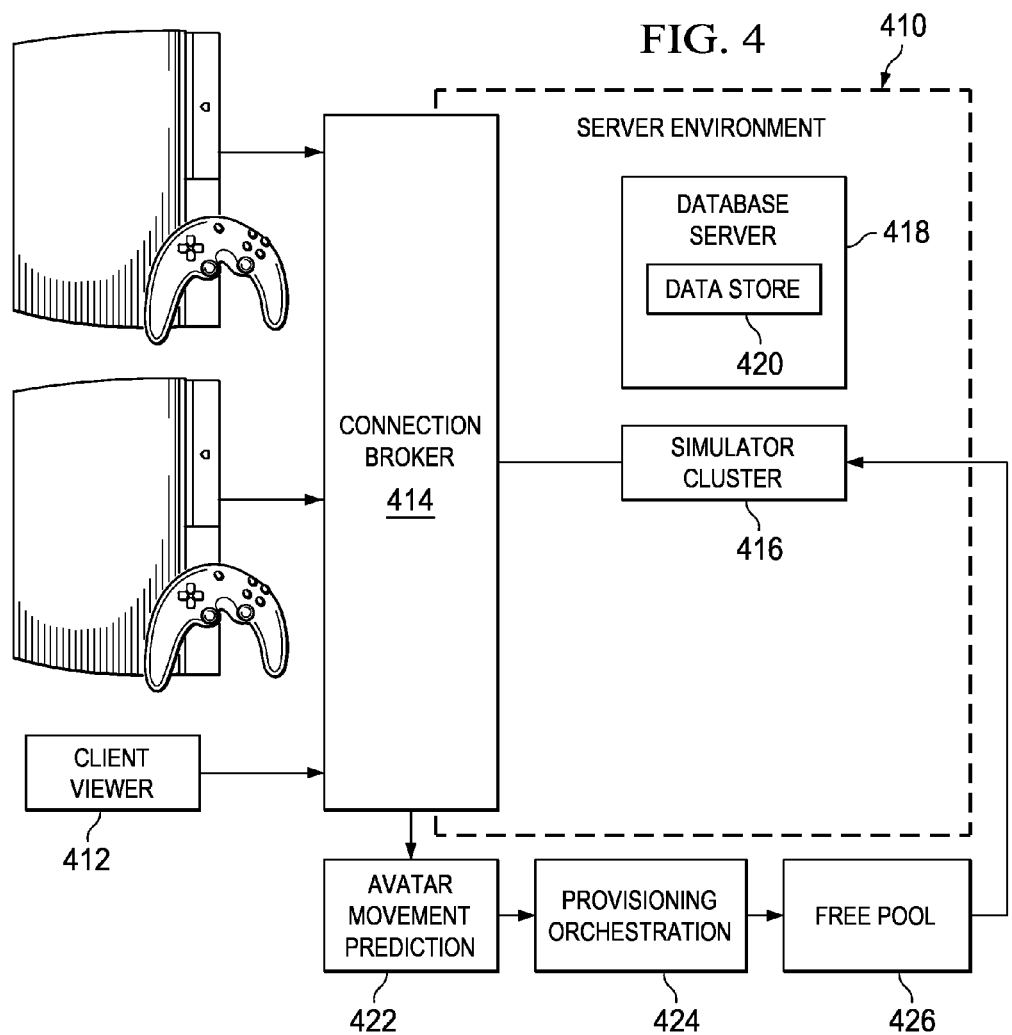
FIG. 4 is a block diagram of the data flow between various hardware and software components of a server environment according to an illustrative embodiment.

Referring now to FIG. 4, a block diagram of the data flow between various hardware and software components of a server environment is shown according to an illustrative embodiment. Server environment 410 includes hardware components implementing an virtual universe.

Client viewer 412 is a data processing system such as one of clients 110, 112, and 114 in FIG. 1. Client viewer 412 executes software which allows a user access to a virtual universe implemented on server environment 410. Client viewer 412 allows a user to control an avatar within the virtual universe implemented on server environment 410.

Connection broker 414 is a data processing system that manages access from client viewer 412 to the virtual universe implemented on server environment 410. Connection broker 414 maintains information about each avatar within the virtual universe.

Simulator cluster 416 can be server 300 of FIG. 3. The various regions of a virtual universe can be implemented on separate servers of simulator cluster 416.

Data base server 418 is a server containing data store 420. Data store 420 contains any persistent state information for regions, and the objects within those regions, of the virtual universe. By removing the persistent state information of the regions to data store 420 of data base server 418, each region of the virtual universe effectively becomes an execution engine for the interaction between a user's avatar and objects within that region of the virtual universe.

In order to render objects to an avatar within a certain region of the virtual universe, connection broker 414 tracks the location of each avatar with the virtual universe, and the region which that avatar is currently populating. A region is a quantized area of the virtual universe as implemented by the virtual universe grid software, such as virtual universe grid software 308 of FIG. 3. Through interaction with an object based avatar tracking controller, such as object based avatar tracking controller 306 of FIG. 3, connection broker 414 can identify in which region within the virtual universe each avatar is located. By identifying which regions are currently populated with a user's avatar, the connection broker 414 can also identify which regions are not currently populated by a user's avatar.

By maintaining information regarding the location of an avatar within the virtual universe, connection broker 414 can monitor which regions of the virtual universe are populated regions, and which are unpopulated regions. A populated region is a region where an avatar is presently located. An unpopulated region is a region where an avatar is not presently located.

Under certain circumstances, unpopulated regions can be deactivated. Because there are no user avatars within an unpopulated region, there is no need to maintain these regions as active. By deactivating unpopulated regions, server environment 410 can conserve resources for allocation to other active regions.

However, an avatar does not only interact with their current region in which the avatar is located. Each avatar has a horizon. An avatar's horizon is the distance within the virtual universe which the avatar can see, i.e., the rendering distance of the virtual universe. An avatar's horizon may extend from their present region into an adjacent region which the avatar is not currently located. As a user's avatar moves in a particular direction, certain regions will drop out of the avatar's horizon, and new regions will enter the horizon. These adjacent regions may or may not be populated by other avatars.

Because an avatar can interact with objects in adjacent regions, those adjacent regions within the horizon must be active. As new regions enter an avatar's horizon, those new regions can be started on demand. Unpopulated regions can be deactivated once they have left the avatar's horizon.

If regions were activated strictly upon entering an avatar's horizon, the user may see performance issues as the edge of the world is powered up. Therefore, connection broker 414 also tracks an avatar's vector movement within the virtual universe. By knowing the directional movement and velocity of an avatar, unpopulated regions adjacent to the avatar's region can be preemptively activated, decreasing any performance issues due to activation times of those adjacent regions.

Avatar movement prediction 422 is a software component that predicts the probable future location of an avatar within the virtual universe. Avatar movement prediction 422 receives vector movement information about an avatar from connection broker 414. Based on an avatar's current vector movement, avatar movement prediction 422 can anticipate a probability that a certain region will enter a user avatar's horizon. Avatar movement prediction 422 informs connection broker 414 of these probable regions. Connection broker 414 can then preemptively activate these probable regions prior to those regions entering the horizon of a user avatar.

In one illustrative embodiment, unpopulated regions can be kept active after the unpopulated regions have dropped beyond a user avatar's horizon. To prevent repetitious activation and deactivation of a region, an unpopulated region can be kept active until there are no user avatars within an extended distance from that region. The extended distance can be a multiple of the user's horizon, such as, for example, twice the horizon distance.

In some virtual universes, a user's avatar is not limited to linear travel between adjacent regions. Besides linear travel, a user's avatar is also often allowed to teleport to any arbitrary, non-adjacent region. While this arbitrary, non-adjacent region may be a populated region, teleportation travel is not necessarily limited to populated regions. Thus, the client would experience an additional time lag as the environment of this non-adjacent region was activated by connection broker 414.

In one illustrative embodiment, connection broker 414 accumulates statistics based on usage patterns of particular regions within the virtual universe. Based on prior usage activity, connection broker 414 will therefore track the statistical probability of a particular region being needed at any point in time. Connection broker 414 can communicate these region usage patterns and statistics to avatar movement prediction 422.

Avatar movement prediction 422 uses region usage patterns and statistics to speculatively activate probable unpopulated regions of the virtual universe. In one illustrative embodiment, avatar movement prediction 422 uses a Bayesian predictive engine to speculatively determine probable regions for activation. The Bayesian predictive engine can be based on, for example, but not limited to, a time of day, as well as patterns of usage in other regions of the virtual universe.

Provisioning orchestration 424 is a software process that synchronizes state information for objects within inactive regions when those regions are activated. The action taken to synchronize the state information by provisioning orchestration 424 depends on the object type within the region.

If the object within the region to be activated is stateless, provisioning orchestration 424 synchronizes the object by mirroring state information off of an object from another active region. Upon activation of the region, provisioning orchestration's 424 mirrored objects do not carry a history from an existing different object in an active region.

If an object in the region to be activated is stateful, that is, the object maintains a history of interactions with the object, but does not interact with the outside world in stateful ways, provisioning orchestration 424 synchronizes the region differently. Objects that don't interact with the virtual universe in a stateful manner are those objects whose state does not depend on interaction from a user's avatar. Because the object does not interact with the virtual universe in a stateful way, all interactions of the object with the virtual universe are mathematically deterministic. When the region is activated, provisioning orchestration 424 replays to the object the missed time during which the region was inactive. Provisioning orchestration 424 replays this time in an accelerated mode.

In one illustrative embodiment, an accelerated roll forward of the region can be done on regular intervals throughout the virtual universe world. An outside agent can periodically iterate through idle regions of the virtual universe, sequentially updating the state data for the various inactive, unpopulated regions. By providing a periodic iterative update of each region in the virtual universe, less catch-up time is needed for objects when inactive regions are activated.

In situations where stateful objects programmatically interact with the virtual universe through avatar interaction, neither of these approaches are viable. However the load placed on simulator cluster 416 by such programmatically interactive stateful objects in the virtual universe is significantly less than a populated region.

Free pool 426 is a collection of available system resources in which an inactive region can be activated. In one illustrative embodiment, free pool 426 is a collection of idle virtual machines. When a new region is activated, that region is allocated into one of the free virtual machines of free pool 426.

Figure 5:
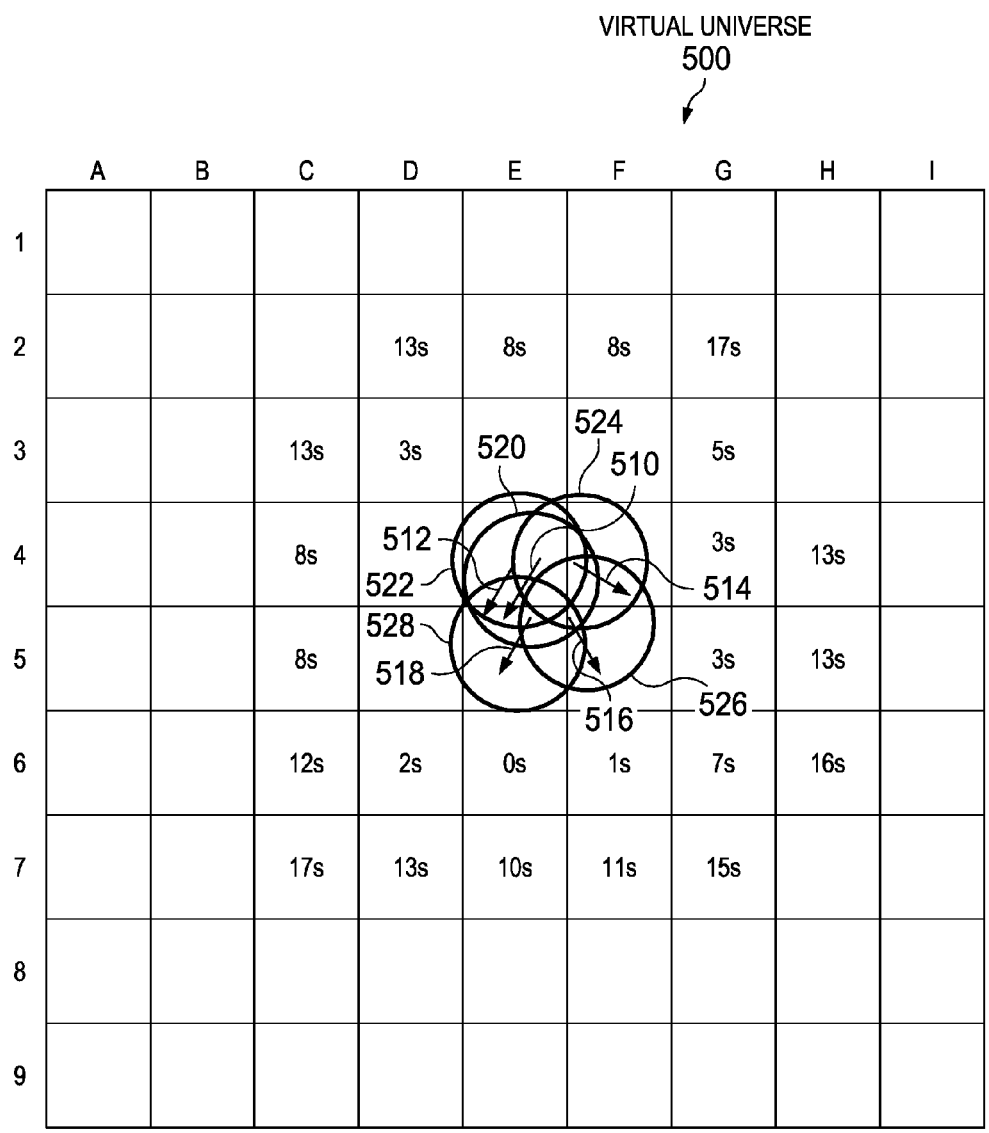
FIG. 5 is a schematic diagram of a virtual universe according to an illustrative embodiment.

Referring now to FIG. 5, a schematic diagram of a virtual universe is shown according to an illustrative embodiment. Virtual universe 500 is a schematic view of the various regions that are modeled into a virtual universe by virtual universe grid software, such as virtual universe grid software 308 of FIG. 3.

Virtual universe 500 is subdivided into a plurality of regions. Each region is represented as a cell within the virtual universe grid. Virtual universe 500 therefore includes 81 regions, A1-I9.

Five separate avatars are active within virtual universe 500. Avatar 510 and 512 currently populate region E4. Avatar 514 currently populates region F4. Avatar 516 currently populates region F5. Avatar 518 currently populates region E5.

Each of avatars 510-518 are represented by a vector, indicating their direction, and velocity. This vector is tracked by a connection broker, such as connection broker 414 of FIG. 4.

Regions E4, E5, F4, and F5 are populated regions. Therefore, each of those regions is active.

Each of avatars 510-518 has an associated horizon. Horizon 520 is associated with avatar 510. Horizon 522 is associated with avatar 512. Horizon 524 is associated with avatar 514. Horizon 526 is associated with avatar 516. Horizon 528 is associated with avatar 518.

Horizon 520 extends into regions E3 and D4. Therefore, regions E3 and D4 are active regions. Horizon 524 extends into regions E3 and F3. Therefore region E3 and F3 are active regions. Horizon 528 extends into regions D4 and D5. Therefore regions D4 and D5 are active regions. Even though no user avatars are located within regions D3, D4, E3, and F3, avatars can still interact with objects that are located in those regions.

Each inactive region within virtual universe 500 takes some amount of time to activate. While the specific amount of time will vary among virtual universes based largely on the specifications of hardware implementing the virtual universe, a typical region activation time is known for each server cluster, such as simulator cluster 416 of FIG. 4. Virtual universe 500 has a typical region activation time of 10 seconds. It is recognized that the region activation time of 10 seconds for virtual universe 500 is for purposes of the present example only, and is not limiting. Region activation times are expected to vary based on network traffic, and hardware specifications of the implemented virtual universe.

Movement of each of avatars 510-518 is predicted by an avatar movement prediction software such as avatar movement prediction 422 of FIG. 4. The avatar movement prediction software provides a prediction of where an avatar will be located, given the current vector information for that avatar. When the horizon for an avatar encounters a new region, that region should be active in order for the avatar to be able to interact with that region. Therefore, if the avatar movement prediction software predicts that the horizon of a certain avatar will encounter an inactive region in a timer period less than or equal to the region activation time for the virtual universe, a connection broker such as connection broker 414 of FIG. 4 will activate that region. This horizon encounter with new regions is the activation horizon.

In the present illustrative example, regions C4-5, D3, D6, E2, E6, F2, F6, and G3-6 will all be probabilistically encountered by one or more of horizons 520-528 within the activation horizon. Therefore, a connection broker has begun to activate, or has already activated each of regions C4-5, D3, D6, E2, E6, F2, F6, and G3-6.

In the present illustrative example, regions C3, C6, D2, D7, E7, F7, and H4-5 will not be probabilistically encountered by one or more of horizons 520-528 within the activation horizon. However, each of regions C3, C6, D2, D7, E7, F7, and H4-5 could be soon activated, given avatars' 510-518 vector information.

The remaining regions of virtual universe 500 are beyond the activation horizon. These remaining regions need not be active at this point, given the current location and vector information for avatars 510-518.

Referring now to FIG. 6, a flowchart of the processing steps for predictive determination of avatar location is shown according to an illustrative embodiment. Process 600 is a software process, executing on a software component, such as avatar movement prediction 422 of FIG. 4.

Process 600 begins by receiving location and vector information regarding an avatar from a connection broker (step 610). The connection broker can be connection broker 414 of FIG. 4. Connection broker tracks the location of each avatar within the virtual universe, and the region which avatar is currently populating. Connection broker also tracks an avatars vector movement within the virtual universe. The vector movement of an avatar is the avatar's directional movement and velocity within the virtual universe. The location information includes a current region which is populated by the avatar.

Responsive to receiving the location and vector information for the avatar, process 600 identifies a probabilistic location of the avatar (step 620). The probabilistic location of the avatar is those regions of the virtual universe where the avatar is likely to be located after the passing of a certain amount of time, given the avatar's location and vector information. In one illustrative embodiment, the certain amount of time is the activation horizon for the virtual universe.

Responsive to determining the probabilistic location of the avatar, process 600 then determines those regions of the virtual universe that are within the avatar's activation horizon (step 630). The activation horizon includes those regions that should be active based on an avatar's predicted location within the region activation time. When the horizon, such as one of horizons 520-528 of FIG. 5 encounters a new region, that new region should be active in order for the avatar to be able to interact with that region. Therefore, process 600 predicts that the horizon of a certain avatar will encounter an inactive region in a timer period less than or equal to the region activation time for the virtual universe, a connection broker such as connection broker 414 of FIG. 4 will activate that region.

Responsive to determining the regions of the virtual universe that are within the avatar's activation horizon, process 600 notifies the connection broker of those regions within the activation horizon (step 640), with the process terminating thereafter. The connection broker can then speculatively activate any inactive regions that are within the predicted activation horizon of the avatar.

Referring now to FIG. 7, a flowchart of the processing step for activating a region within a virtual universe is shown according to an illustrative embodiment. Process 700 is a software process executing on a software component, such as connection broker 414 of FIG. 4.

Process 700 begins by sending location and vector information for an avatar within the virtual universe to an avatar movement prediction software (step 710). The avatar movement prediction software can be avatar movement prediction 422 of FIG. 4. Connection broker tracks the location of each avatar with the virtual universe, and the region which that avatar is currently populating. Connection broker also tracks an avatar's vector movement within the virtual universe. The vector movement of an avatar is the avatar's directional movement and velocity within the virtual universe. The location information includes a current region which is populated by the avatar. Responsive to sending location and vector information for an avatar within the virtual universe to an avatar movement prediction software, process 700 polls for a result from the avatar movement prediction software (step 720).

Process 700 receives from the avatar movement prediction software an identification of those regions of the virtual universe which an avatar is likely to encounter within the avatar's activation horizon (step 730). The avatar movement prediction software provides a prediction of where an avatar will be located, given the current vector information for that avatar. When the horizon for an avatar encounters a new region, that region should be active in order for the avatar to be able to interact with that region. Therefore, the avatar movement prediction software predicts that the horizon of a certain avatar will encounter an inactive region in a timer period less than or equal to the region activation time for the virtual universe.

Responsive to receiving the identification of those regions of the virtual universe which an avatar is likely to encounter within the avatar's activation horizon, process 700 identifies whether the identified regions within the activation horizon are active (step 740). A region is active when that region is available for interaction with a user's avatar. Responsive to identifying that the identified regions within the activation horizon are active, ("yes" at step 740), process 700 terminates. Because the regions within the activation horizon are currently active, those regions do not need to be activated.

Returning now to step 740, responsive to not identifying that the identified regions within the activation horizon are active ("no" at step 740), process 700 activates the inactive regions (step 750). Because the avatar's horizon is likely to encounter the regions within the activation horizon, those regions are preemptively activated in order to prevent a noticeable performance degradation Process 700 can then determine whether the avatar has moved beyond an extended distance from any unpopulated region (step 760). To prevent repetitious activation and deactivation of a region, an unpopulated region that was previously within the activation horizon for an avatar can be kept active until there are no user avatars within an extended distance from that region. The extended distance can be a multiple of the user's horizon, such as, for example, twice the horizon distance. In one illustrative embodiment, unpopulated regions can be kept active after the unpopulated regions have dropped beyond a user avatar's horizon. The extended distance can be a multiple of the user's horizon, such as, for example, twice the horizon distance.

Responsive to determining the avatar has moved beyond an extended distance from any unpopulated region ("yes" at step 760), process 700 deactivates the unpopulated region (step 770), with the process terminating thereafter. Resources that were used to provision the active unpopulated region can now be reallocated to other regions that will be activated in the future.

Returning now to step 760, responsive to not determining the avatar has moved beyond an extended distance from any unpopulated region ("no" at step 760), process 700 does not deactivate the unpopulated region (step 780), with the process terminating thereafter. Avatar movement has not caused any unpopulated regions to lie within an extended distance from an avatar. Therefore, no regions are deactivated.

Figure 8:
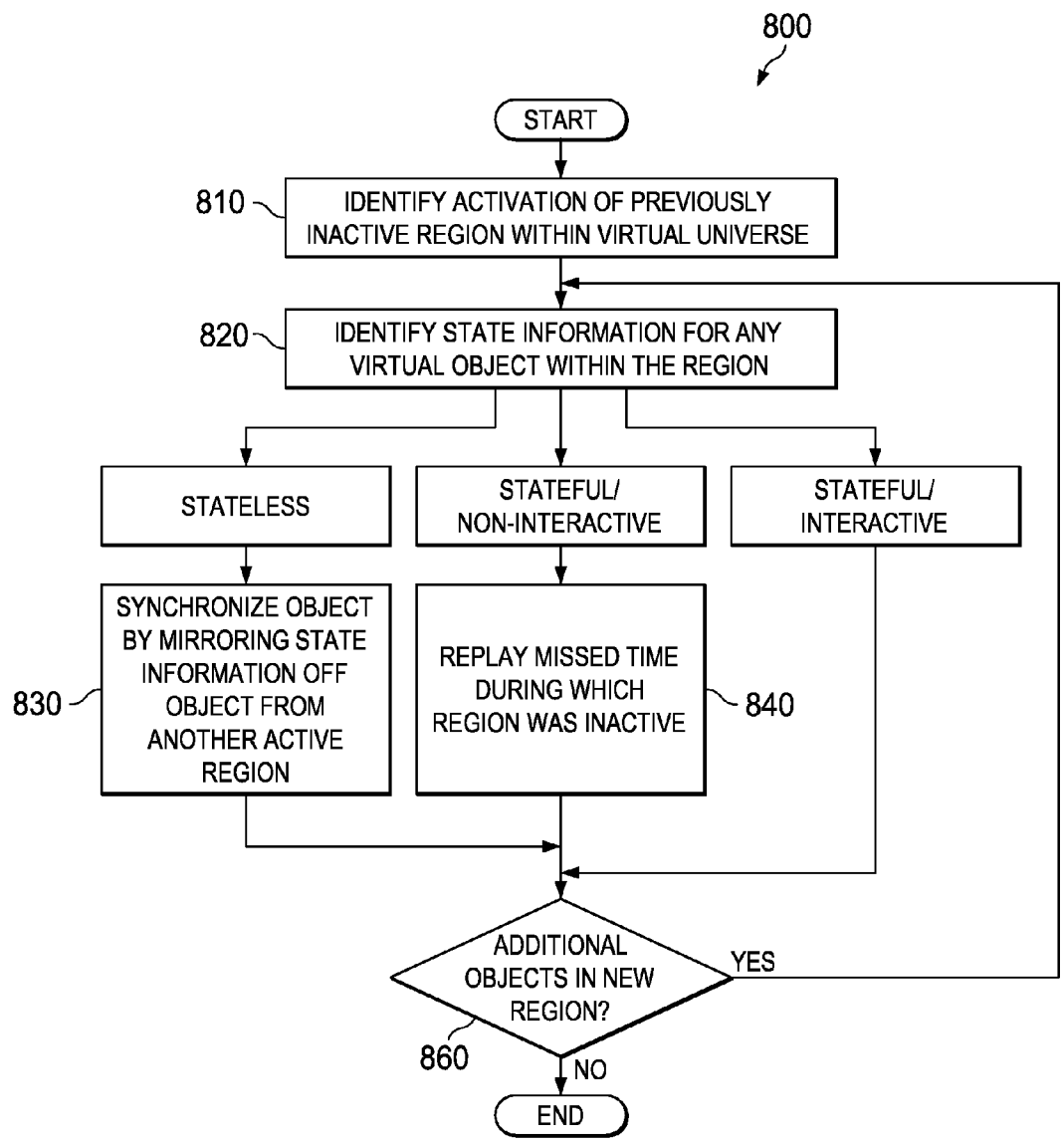
FIG. 8 is a flowchart of a process for updating objects within a newly activated region according to an illustrative embodiment.

Referring now to FIG. 8, a flowchart of a process for updating objects within a newly activated region is shown according to an illustrative embodiment. Process 800 is a software process, executing on a software component, such as provisioning orchestration 424 of FIG. 4.

Process 800 begins by identifying the activation of a previously inactive region within the virtual universe (step 810). Process 800 can identify the activation of a previously inactive region by receiving a notification of the activation of the region from a connection broker, such as connection broker 414 of FIG. 4.

Responsive to identifying the activation of a previously inactive region within the virtual machine, process 800 identifies state information for any virtual object within the region (step 820).

Responsive to process 800 identifying state information for a virtual object within the region as stateless ("stateless" at step 820), process 800 synchronizes the object by mirroring state information off of an object from another active region (step 830). Upon activation of the region, process 800 mirrored objects do not carry a history from an existing different object in an active region. Process 800 then proceeds to step 860 to determine the existence of any additional objects in the new region (step 860).

Returning now to Step 820, Responsive to process 800 identifying state information for a virtual object within the region as stateful/non-interactive ("stateful/non-interactive" at step 820), process 800 replays to the object the missed time during which the region was inactive (step 840). Stateful/non-interactive objects maintain a history of interactions with the object, but do not interact with the outside world in stateful ways. Stateful/non-interactive. Objects that do not interact with the virtual universe in a stateful manner are those objects whose state does not depend on interaction from a user's avatar. Because the object does not interact with the virtual universe in stateful way, all interactions of the object with the virtual universe are mathematically deterministic. When the region is activated, process 800 replays to the object the missed time during which the region was inactive. Process 800 can replay this time in an accelerated mode. Process 800 then proceeds to step 860 to determine the existence of any additional objects in the new region (step 860).

In one illustrative embodiment, an accelerated roll forward of the region can be done on regular intervals throughout the virtual universe world. An outside agent can periodically iterate through idle regions of the virtual universe, sequentially updating the state data for the various inactive, unpopulated regions. By providing a periodic iterative update of each region in the virtual universe, less catch-up time is needed for objects when inactive regions are activated.

Returning now to Step 820, responsive to process 800 identifying state information for a virtual object within the region as stateful/interactive ("stateful/interactive" at step 820), process 800 proceeds to step 860 to determine the existence of any additional objects in the new region (step 860). Regions where stateful objects programmatically interact with the virtual universe through avatar interaction are maintained in an active state. The load placed on simulator cluster by such programmatically interactive stateful objects in the virtual universe is significantly less than a populated region.

Process 800 then identifies any additional objects in the new region (step 860). Responsive to identifying an additional object within the new region ("yes" at step 860), process 800 returns to step 820 to update state information for that additional object. Responsive to not identifying an additional object within the new region ("no" at step 860), process 800 terminates.

The illustrative embodiments monitor the presence and absence of avatars for a map region. An intelligent look ahead is deployed to predict immediate avatar movement and location based on the avatar's current location and vectored movement. For unpopulated map regions without avatar presence, the region can be deactivated, and state updates can be suspended. Upon an avatar probabilistically encountering a deactivated region, a simulator re-dispatch correctly updates the state of objects and processes in map area. The state of the objects and process are updated for the time passed since the region was last deactivated.

A computer implemented method, a computer program product, and a data processing system manage regions within a virtual universe. A current location of an avatar is identified within a virtual universe, the current location being within a currently populated region. A vectored movement of the avatar is identified. Any adjacent region that may probabilistically encounter a horizon of the avatar within a region activation time of the virtual universe is identified. If the adjacent region is deactivated, then the adjacent region is activated. An unpopulated region that is currently active is identified, wherein the unpopulated region is within an extended distance from the avatar's current location. The unpopulated region is then deactivated.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method performed by a computer system for managing regions within a virtual universe, the method comprising:
   identifying a current location of an avatar within the virtual universe, the current location being within a currently populated region;
   identifying a vectored movement of the avatar;
   responsive to identifying the avatar's vectored movement, identifying an adjacent region within the virtual universe that is currently inactive, wherein the adjacent region may probabilistically encounter a horizon of the avatar within a region activation time of the virtual universe; and
   responsive to identifying the currently inactive adjacent regions that may probabilistically encounter a horizon of the avatar within a region activation time, activating the adjacent region.

2. The computer implemented method of claim 1 further comprising:
   responsive to identifying the avatar's current location, identifying an unpopulated region that is currently active, wherein the unpopulated region is within an extended distance from the avatar's current location;
   responsive to identifying the unpopulated region that is currently active, wherein the unpopulated region is within an extended distance from the avatar's current location, deactivating the unpopulated region.

3. The computer implemented method of claim 1, wherein the current location and the vectored movement are identified from a connection broker, wherein the connection broker maintains information including the current location, the vectored movement, statistics based on usage patterns about each avatar within the virtual universe, communicating the information to a movement prediction to identify a region for speculative activation.

4. The computer implemented method of claim 2, wherein the extended distance is a configurable multiple of the distance of the horizon of the avatar.

5. The computer implemented method of claim 1, wherein activating the adjacent region further comprises:
   identifying an object within the adjacent region;
   identifying a state information associated with the object; and
   updating the state information associated with the object.

6. The computer implemented method of claim 5, wherein the step of updating the state information associated with the object is selected from the group consisting of mirroring state information off of associated with an object from another active region, and replaying a missed time during which the region was inactive.

7. The computer implemented method of claim 1, further comprising:
periodically updating a state information associated within an inactive region, wherein the updating is performed by temporarily activating the inactive region in order to update the state information.

8. A computer program product for managing regions within a virtual universe, the computer program product comprising:
a computer readable recordable storage medium having computer usable program code embodied therewith, the computer usable program code comprising:
first instructions to identify a current location of an avatar within the virtual universe, the current location being within a currently populated region;
second instructions to identify a vectored movement of the avatar;
third instructions, responsive to identifying the avatar's vectored movement, instructions to identify an adjacent region within the virtual universe that is currently inactive, wherein the adjacent region may probabilistically encounter a horizon of the avatar within a region activation time of the virtual universe;
fourth instructions, responsive to identifying the currently inactive adjacent regions that may probabilistically encounter a horizon of the avatar within a region activation time, to activate the adjacent region.

9. The computer program product of claim 8 further comprising:
fifth instructions, responsive to identifying the avatar's current location, to identify an unpopulated region that is currently active, wherein the unpopulated region is within an extended distance from the avatar's current location;
sixth instructions, responsive to identifying the unpopulated region that is currently active, wherein the unpopulated region is within an extended distance from the avatar's current location, to deactivate the unpopulated region.

10. The computer program product of claim 8, wherein the current location and the vectored movement are identified from a connection broker, wherein the connection broker maintains information including the current location, the vectored movement, statistics based on usage patterns about each avatar within the virtual universe, communicating the information to a movement prediction to identify a region for speculative activation.

11. The computer program product of claim 9, wherein the extended distance is a configurable multiple of the distance of the horizon of the avatar.

12. The computer program product of claim 8, wherein the fourth instructions to activate the adjacent region further comprises:
seventh instructions to identify an object within the adjacent region;
eighth instructions to identify a state information associated with the object;
ninth instructions to update the state information associated with the object.

13. The computer program product of claim 12, wherein the ninth instructions to update the state information associated with the object is selected from the group consisting of instructions to mirror state information associated with an object from another active region, and instructions to replay a missed time during which the region was inactive.

14. The computer program product of claim 8, further comprising:
tenth instructions to periodically update a state information associated within an inactive region, wherein the updating is performed by temporarily activating the inactive region in order to update the state information.

15. A data processing system for managing regions within a virtual universe, the data processing system comprising:
a bus;
a memory connected to the bus, the memory comprising computer executable instructions; and
a processor unit connected to the bus, wherein the processor unit executes the computer executable instructions directing the data processing system:
to identify a current location of an avatar within the virtual universe, the current location being within a currently populated region;
to identify a vectored movement of the avatar; responsive to identifying the avatar's vectored movement, instructions to identify an adjacent region within the virtual universe that is currently inactive, wherein the adjacent region may probabilistically encounter a horizon of the avatar within a region activation time of the virtual universe; and
responsive to identifying the currently inactive adjacent regions that may probabilistically encounter a horizon of the avatar within a region activation time, to activate the adjacent region.

16. The data processing system of claim 15, wherein the processor unit further executes the computer executable instructions directing the data processing system:
responsive to identifying the avatar's current location, to identify an unpopulated region that is currently active, wherein the unpopulated region is within an extended distance from the avatar's current location; and responsive to identifying the unpopulated region that is currently active, wherein the unpopulated region is within an extended distance from the avatar's current location, to deactivate the unpopulated region.

17. The data processing system of claim 15, wherein the current location and the vectored movement are identified from a connection broker, wherein the connection broker maintains information including the current location, the vectored movement, statistics based on usage patterns about each avatar within the virtual universe, communicating the information to a movement prediction to identify a region for speculative activation.

18. The data processing system of claim 15, wherein the processor unit further executes the computer executable instructions directing the data processing system: to identify an object within the adjacent region; to identify a state information associated with the object; and to update the state information associated with the object.

19. The data processing system of claim 18, wherein the computer executable instructions directing the data processing system to update the state information associated with the object is selected from the group consisting of instructions to mirror state information associated with an object from another active region, and instructions to replay a missed time during which the region was inactive.

20. The data processing system of claim 15, wherein the processor unit further executes the computer executable instructions directing the data processing system: to periodically update a state information associated within an inactive region, wherein the updating is performed by temporarily activating the inactive region in order to update the state information.

* * * * *